Nov. 28, 1967  R. O. MANSPEAKER  3,354,842
CRIMPING AND FORMING MEANS FOR PIE MAKING MACHINES
Filed May 28, 1965  2 Sheets-Sheet 1
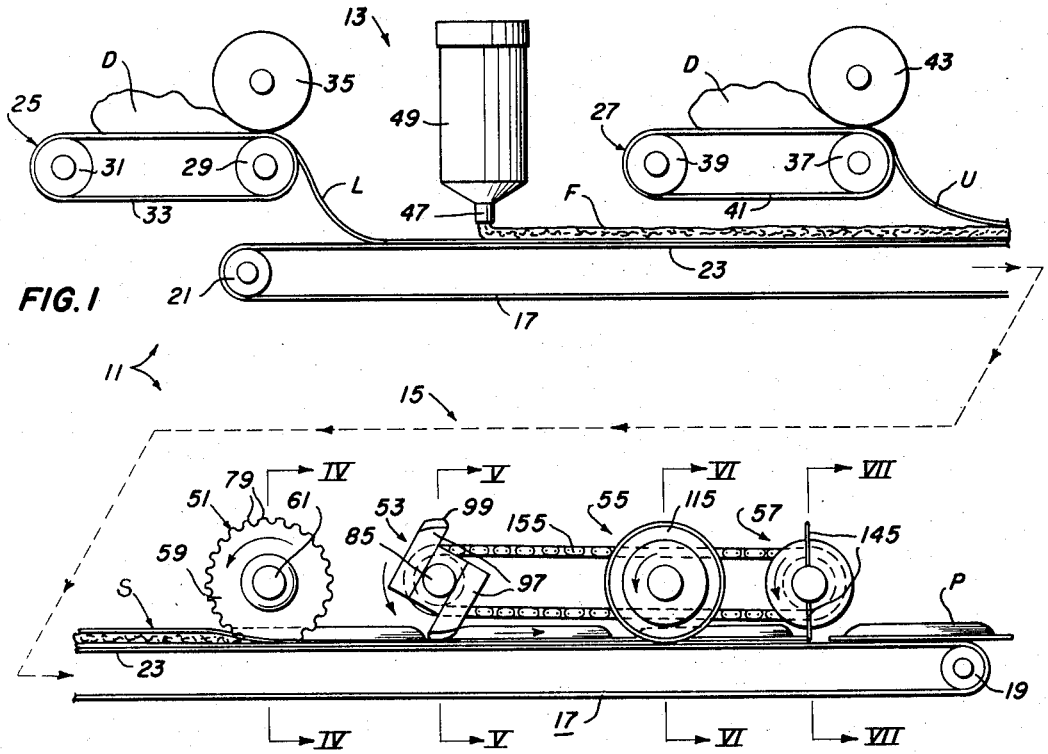
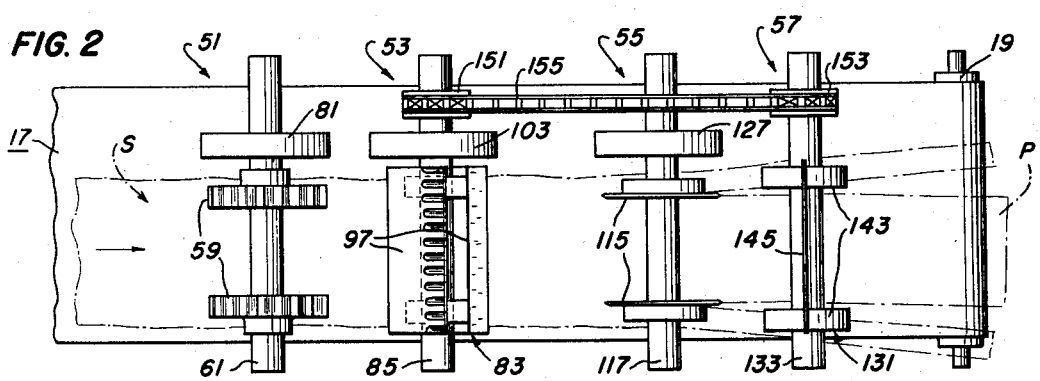
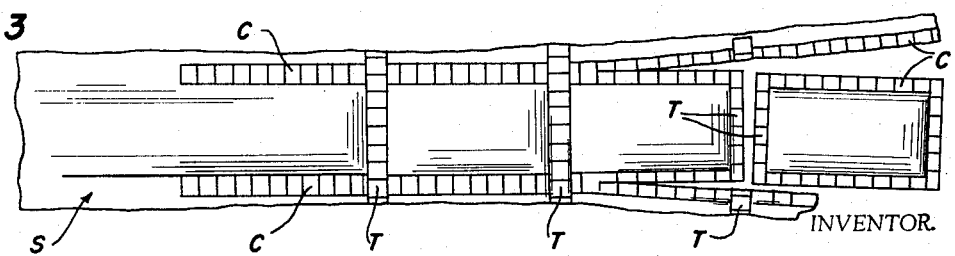
INVENTOR.
ROBERT O. MANSPEAKER
BY John R. Walker, III
Attorney Nov. 28, 1967  R. O. MANSPEAKER  3,354,842
CRIMPING AND FORMING MEANS FOR PIE MAKING MACHINES
Filed May 28, 1965  2 Sheets-Sheet 2
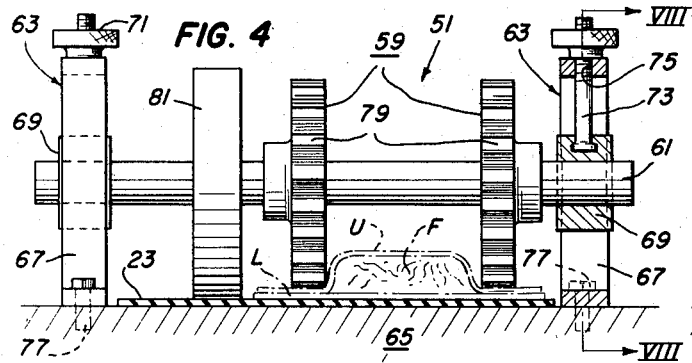
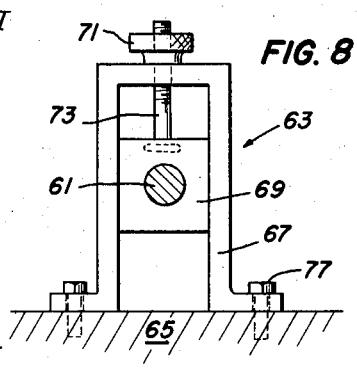
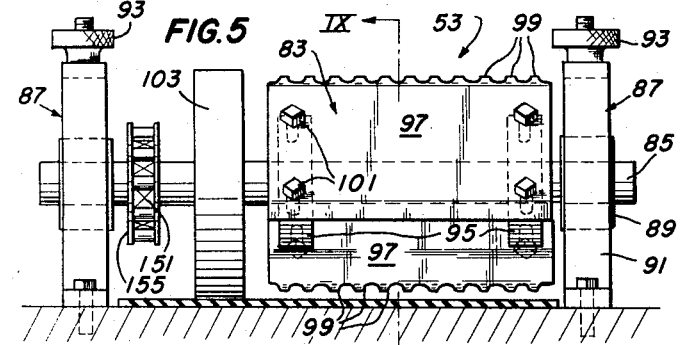
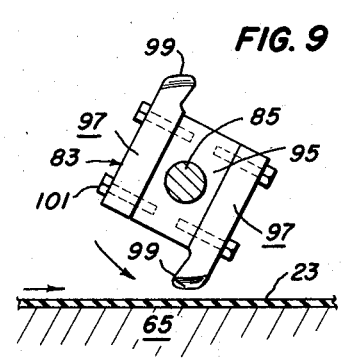
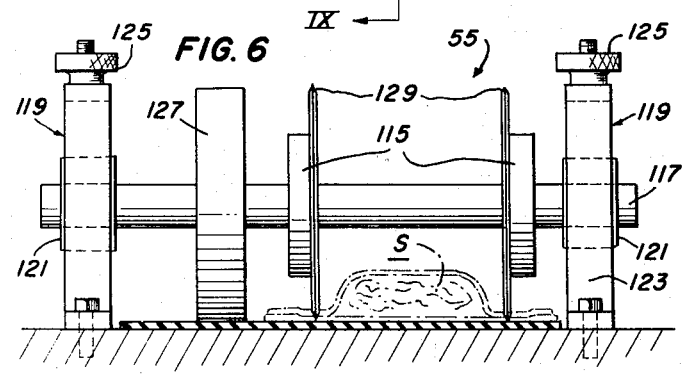
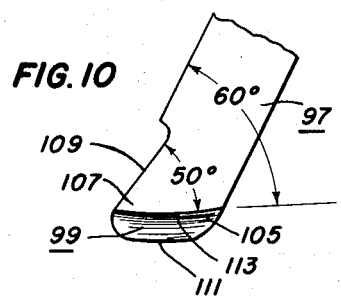
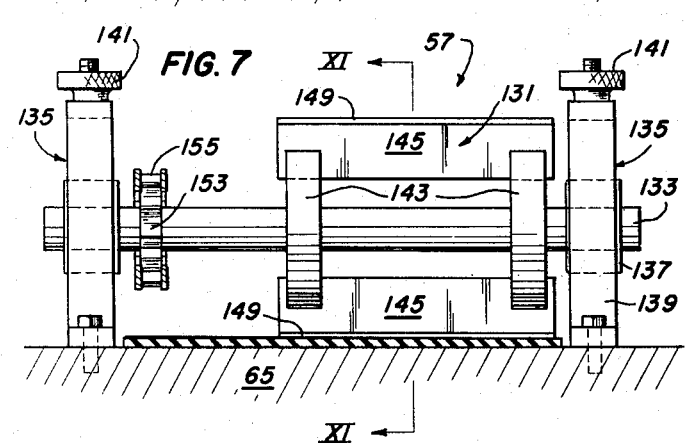
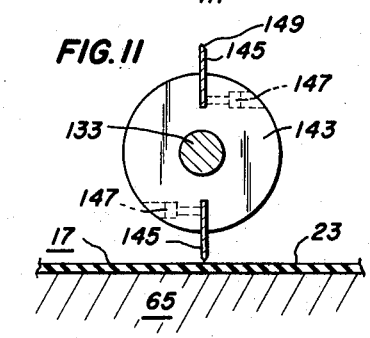
INVENTOR.
ROBERT O. MANSPEAKER
BY John R. Walker, III
Attorney

United States Patent Office 3,354,842
Patented Nov. 28, 1967

3,354,842
CRIMPING AND FORMING MEANS FOR PIE MAKING MACHINES
Robert O. Manspeaker, Memphis, Tenn., assignor of twenty-five percent to Roy Woods, Memphis, Tenn., and of fifty percent to Margaret Woods, Memphis, Tenn.
Filed May 28, 1965, Ser. No. 459,613
9 Claims. (Cl. 107—1)

ABSTRACT OF THE DISCLOSURE

In a pie-making apparatus of the type having means for forming and conveying a continuous reach of pie stock on a conveyor belt, the improvement including means for forming the reach of pie stock into a plurality of individual pies comprising successively arranged (1) crimping wheel means, (2) crimping bar means, (3) cutter wheel means and (4) cutter bar means: In operation of the apparatus, the crimping wheel means and cutter wheel means act continuously and respectively roll and cut the reach of pie stock longitudinally; the crimping bar means and cutter bar means act synchronously intermittently and respectively press and cut the reach of pie stock transversely.

---

This invention relates to crimping and forming means for pie making machines, and particularly relates to mechanisms for use in machines employed in making small fruit-filled fried pies.

In making fried pies, typically, the steps include forming a narrow web or reach of fruit-filled pie stock, processing the pie stock into a plurality of pies, cooking the pies, and then wrapping and processing them for shipment. Typically, a so-called pie making machine is employed in carrying out the first and second of the above-mentioned steps; a pie making machine first forms a long reach of pie stock from thin sheets of pie dough and fruit filling and then processes the stock into individual pies ready for cooking.

Typically, a pie making machine includes a flat conveyor belt and (1) means for rolling pie dough into a long thin sheet and depositing the sheet on the moving conveyor belt; (2) means for depositing the fruit filler on the sheet of dough; (3) means for placing another sheet of dough over the fruit filling and first sheet of dough to form a reach or sandwich-like length of pie stock on the conveyor belt; and (4) means for forming individual pies from the pie stock and crimping the edges of the pies. The present invention specifically concerns the last-mentioned step, namely, means for forming and crimping the individual pies from the long length of pie stock.

In most fried pie machines currently in use, the individual pies are formed from the pie stock by hand. Typically, one or more workmen stand alongside the moving conveyor of the machine and stamp, cut and crimp the pies from the pie stock. In forming pies by hand, several problems or difficulties existed, namely: Considerable waste in dough and fruit filler material resulted; it was difficult to form pies of uniform size and quality; it was slow work and work requiring considerable skill and practice; and it required several workmen and was expensive.

The general object of the present invention is to provide a mechanically simple, durable, trouble-free and practical mechanism for forming individual pies from the formed length or reach of pie stock in a pie making machine.

A further object is to provide such a mechanism which can be used to quickly and easily convert an existing machine with which hand forming of the pie stock is employed to a machine in which the crimping and forming is mechanically done and without the necessity of changing or adding to the drive mechanism of the machine.

A further object is to provide such a mechanism having unique drive means.

A further object is to provide such a mechanism which is substantially self-operable and which does not require a number of workmen or attendants.

A further object is to provide a mechanism which operates rapidly and forms many more pies in a given time than could previously be formed by hand.

A further object is to provide such a pie forming mechanism that substantially reduces the waste in dough and pie filler material previously occurring in hand-formed pies.

A further object is to provide sanitary means for forming pies.

A further object is to provide means for forming pies of uniform size and quality.

The means by which the foregoing and other objects of the present invention are accomplished and the manner of their accomplishment will be readily understood from the following specification upon reference to the accompanying drawings, in which:

FIG. 1 is a schematically shown side view of a pie making machine incorporating the pie making mechanism of the present invention.

FIG. 2 is a schematically shown top view of the pie making mechanism, with a reach of pie stock material being shown in broken lines on the conveyor.

FIG. 3 is a top view of the pie material as being processed in FIG. 2.

FIGS. 4–7 are, respectively, vertical plane sectional views taken transversely of the conveyor and taken as on the lines IV—IV, V—V, VI—VI, and VII—VII of FIG. 1.

FIG. 8 is a sectional view taken as on the line VIII—VIII of FIG. 4.

FIG. 9 is a sectional view taken as on the line IX—IX of FIG. 5.

FIG. 10 is a fragmentary detail view taken as from FIG. 9.

FIG. 11 is a sectional view taken as on the line XI—XI of FIG. 7.

In the drawings, the various parts are indicated by reference characters. In FIG. 1, the schematically illustrated pie making machine in its entirety is indicated by numeral 11. The pie material includes flour dough D, the reach of pie stock indicated generally by the letter S, a lower sheet of dough L, an upper sheet of dough U, and pie filler material F. A pie illustrated as being processed from pie stock S is indicated by the letter P.

FIG. 1 is divided into an upper part and a lower part: the upper part corresponds substantially to that part of means in the machine 11 which forms the reach of pie stock S and is indicated by numeral 13; the lower part corresponds substantially to that part or means of machine 11 which processes the reach of pie stock S into the plurality of pies P and is indicated by numeral 15. The flat conveyor belt of machine 11 is indicated generally by numeral 17. Conveyor belt 17 extends around a forward cylindrical pulley 19 and a rearward cylindrical pulley 21. Conveyor belt 17 is driven by suitable means in a clockwise direction, as viewed in FIG. 1. The upper span 23 of conveyor belt 17 is adapted to be moved toward forward pulley 19 or toward the right as viewed in FIGS. 1 and 2.

Basically, pie stock forming means 13 includes a like pair of dough roller or dough sheeter mechanisms 25, 27. Dough sheeter mechanism 25 includes cylindrical drive and idler rollers 29, 31, respectively, a flat belt 33 interconnecting the drive and idler rollers, and a press roll 35 disposed above drive roller 29. By the same token, dough sheeter mechanism 27 includes a drive roller 37, an idler roller 39, a flat belt 41, and a press roll 43. Dough sheeter mechanisms 25, 27 are positioned respectively over conveyor belt 17 and are disposed in tandem arrangement. A pie filler dispenser 49 is disposed between dough sheeter mechanisms 25, 27 and over conveyor belt 17.

When machine 11 is in operation, dough sheeter mechanisms 25, 27 are charged respectively with dough D. The dough of the respective mechanisms 25, 27 is fed between the respective flat belts 33, 41 and press rolls 35, 43 and form respectively moving sheets of dough. The dough sheet issuing from mechanism 25 is deposited on the upper surface of conveyor belt 17 and constitutes the lower sheet L of pie stock S. The sheet of dough issuing from mechanism 27 constitutes the upper sheet U of pie stock S. Pie filler F, extruding through nozzle 47 of pie filler dispenser 49, is dispensed row-like along the upper surface of lower dough sheet L and is sandwiched between the upper and lower sheets to form the reach of pie stock S.

It should be understood that the pie stock forming means 13 as illustrated and described forms no part of the present invention and is for exemplification only. The means for forming a reach of pie stock on a conveyor varies considerably with different machines, and it may be of any type, either manual or mechanical. Also, certain pie making machines may employ only one dough sheeter mechanism, and the dough sheet issuing therefrom folded over the fruit filler. Pies made from machines such as this are known as fold-over or turn-over pies. Whether the reach of pie stock is formed from a single sheet folded over a fruit filler center, or whether the stock is formed from two separate sheets of dough with the fruit filler sandwiched between will depend upon the particular machine. The present invention is applicable in machines making either kind of pie; however, for purposes of clarity in the description, the sandwich or waffle type pie making machine has been illustrated and will be described.

The means 15 for forming or processing pie stock S into a plurality of pies P includes crimping wheel means 51, crimping bar means 53, cutter wheel means 55, and cutter bar means 57, arranged successionally along conveyor belt 17. The crimping wheel, crimping bar, cutter wheel, and cutter bar means successionally longitudinally crimp, transversely crimp, longitudinally cut, and transversely cut and process the pie stock S into individual pies P.

Crimping wheel means 51 includes a pair of spaced crimping wheels 59 mounted on a shaft 61 and rotatably journaled in a pair of bearing assemblies 63 (see FIG. 4). Crimping wheels 59 are adapted to roll longitudinally along the upper dough sheet of pie stock S and along opposite sides of the row of pie filler F. Wheels 59 press and crimp the upper and lower dough sheets together and form longitudinally extending crimp line portions C along the pie stock (see FIG. 3). Bearing assemblies 63 are securely mounted on base 65 of machine 11 and are disposed respectively on opposite sides of conveyor belt 17. Each bearing assembly 63 includes an inverted U-shaped support member 67, a bearing block 69 slidably mounted in support member 67, and adjustment means for effecting the vertical adjustment of block 69 in support member 67. The adjustment means of each assembly 63 includes a knob 71 and a bolt 73. The head portion of bolt 73 is fixedly secured in bearing block 69, and the threaded shank portion projects upwardly through an aperture 75 in support member 67. Turnably manipulating knob 71 elevationally positions shaft 61 relative to conveyor belt 17. It will be understood that base 65 of machine 11 has been illustrated schematically. Also, somewhat schematically shown is the arrangement and mounting respectively of bearing assemblies 63. For clarification in description, however, it will be considered that bolts 77, extending respectively through the leg portions of support members 67, securely fasten the respective bearing assemblies 63 to base 65 of the machine.

The circumferential rim portions respectively of the pair of crimping wheels 59 are crenelated or undulated and provided with teeth-like projections 79. The crenelated or undulated rim surfaces respectively of crimping wheels 59 are adapted to roll along the upper surface of upper dough sheet U and to crimp-seal the upper and lower dough sheets of the pie stock together. A friction drive wheel 81 is fixedly mounted on shaft 61. Friction drive wheel 81 is preferably provided with a circumferential rim of rubber or resilient material. In addition to increasing the effectiveness of frictional contact of drive wheel 81 with conveyor belt 17, the resiliency of the rim of wheel 81 permits correct adjustment of the spacing between the crenelated undulated rim surfaces of crimping wheels 59 and the upper surface of conveyor belt 17. The upper span 23 of conveyor belt 17, moving under friction wheel 81 and between the resilient rim surface of the wheel and the upper surface of machine base 65, frictionally drives crimping wheels 59 and longitudinally crimps pie stock S.

Crimping bar means 53 is arranged somewhat like crimping wheel means 51 and includes a crimping bar assembly 83, a shaft 85, mounting assembly 83, and a pair of bearing assemblies 87 mounting shaft 85 and assembly 83 on machine base 65. Each of bearing assemblies 87 is substantially like assemblies 63 and includes a bearing block 89 slidably secured in an inverted U-shaped support member 91 and an adjustment knob 93 for elevatingly positioning shaft 85. Crimping bar assembly 83 includes a pair of support blocks 95 spaced and fixed securely on shaft 85, and a pair of crimping bars 97 secured to the support blocks and disposed on opposite sides of shaft 85 (see FIGS. 5 and 9). Crimping bars 97 respectively are rectangular in cross-section, and each includes an undulated crenelated surface extending along one edge portion and teeth-like projections 99. Bolts 101, extending respectively through apertures in crimping bars 97 and threadedly fitted in support blocks 95, securely mount the crimping bars on blocks 95. The teeth-like projections 99 of crimping bars 97 correspond in size with the teeth-like projections 79 of crimping wheel 59. Projections 99 and the respective undulated surfaces of crimping bars 97 extend substantially parallel to shaft 85 and transversely of conveyor belt 17. A friction drive wheel 103, substantially like wheel 81, is mounted on shaft 85 in rotatable engagement with the upper surface of conveyor belt 17 and rotates crimping bar assembly 83. The undulated surface projections 99 of crimping bars 97 are adapted to intermittently engage pie stock S and form transversely extending crimp line portions T in the pie stock.

An important feature in the function of crimping bar means 53 is the structure and arrangement of projections 99 of the crimping bars. With reference to FIGS. 9 and 10, it will be noted that crimping bars 97 respectively are disposed angularly and that the leading edge portion 105 and the trailing edge portion 107 of each bar and of each projection 99 are of different configuration. With reference to the fragmentary profile view of FIG. 10, it will be noted that the leading edge portion 105 is contoured less sharply, or contoured along a broader arc, than is the trailing edge portion 107. Preferably, each crimping bar 97 is disposed approximately on a 60-degree angle relative to a chord line of the circular path or arc defined by rotating undulated surface projections 99. Preferably, the trailing edge portion 107 of each crimping bar 97 includes a grooved portion having a trailing surface 109 extending substantially longitudinally of each bar. The transversely extending crest surface 111 and root surface 113 of each tooth-like projection 99 of each crimping bar 97 extend respectively along arcs centered or struck from the axis of shaft 85; the crest and root surfaces 111, 113 respectively are concentric with the cylindrical surface of shaft 85. Preferably, the profile or cross-sectional contour of trailing edge portion 107 is such that an imaginary chord line across root surface 113 is approximately at a 50-degree angle relative to trailing surface 109. The above-described angular arrangement respectively of bars 97 substantially prevents the unwanted formation of pie dough along the leading and trailing edge portions 105, 107 of the respective bars 97, smoothly and cleanly transversely crimps pie stock S, and intermittently forms transversely extending crimp line portions T. Conveyor belt 17, passing between the resilient rim surface of friction drive wheel 103 and the upper surface of machine base 65, rotates crimping bar assembly 83 and intermittently forms the transversely extending crimp line portions T in the reach of pie stock.

Cutter wheel means 55 is of similar structure and functions in much the same manner as crimping wheel means 51. Cutter wheel means 55 includes a pair of cutter wheels 115 spaced apart and mounted on a shaft 117. A pair of bearing assemblies 119 rotatably mount shaft 117 transversely of conveyor belt 17. Each of bearing assemblies 119 is substantially like assemblies 63 and includes a bearing block 121 slidably fitted in a support 123, and a knob 125 for adjusting cutter wheel 115. A friction drive wheel 127, substantially like wheel 81, is mounted on shaft 117 in rotatable engagement with the upper surface of conveyor belt 17 and drives cutter wheels 115. The circumferential edge portion 129 of each cutter wheel 115 is sharpened, and the sharpened edges respectively of wheels 115 are closely spaced from or slightly engage the upper surface of conveyor belt 17. The spacing of cutter wheels 115 or the distance between the wheels corresponds with the distance between the pair of crimping wheels 59 of crimping wheel means 51. The relative arrangement of crimping wheels 59 and cutting wheels 115 is such that when the machine 11 is in operation, edges 129 respectively of cutter wheels 115 medianly sever the respective longitudinally extending crimp line portions C formed by crimping wheels 59.

Cutter bar means 57 includes a cutter bar assembly 131 secured on a shaft 133 and rotatably mounted in a pair of bearing assemblies 135. Each of bearing assemblies 135 is substantially like assemblies 63 and includes a bearing block 137, a support 139 mounted on machine base 65, and a knob 141 for vertically adjusting shaft 133 and bearing assembly 135. Cutter bar assembly 131 includes a spaced pair of annular support members 143 fixedly mounted on shaft 133 and a pair of cutter bars 145 disposed on opposite sides of the shaft. Cutter bars 145 are respectively flat and thin and are fitted snugly in aligned slots provided respectively in members 143. Bolts 147, threadedly fitted in the respective support blocks, abuttingly engage respectively cutter bars 145 and secure the bars in the slots of the support members. Each cutter bar 145 includes a sharpened distal edge portion 149 extending substantially parallel to shaft 133 (see FIG. 7). The cutting edge of edge portion 149 of each cutter bar 145 is adapted to be spaced parallel and contiguous with the upper surface of conveyor belt 17 by manipulating and adjusting knobs 141.

Means are provided for synchronizing substantially the rotational travel or speed of edge portions 149 respectively of cutter bars 145 with the speed or travel of conveyor belt 17. Also, means are provided for synchronizing the travel or rotational movement of undulated projections 99 of crimping bars 97 with the travel or rotational movement of the sharpened edge portions 149 of cutter bars 145. The travel of the respective crimping bar undulated surfaces and the respective cutter bar sharpened edges is synchronized, and also synchronized with the travel of the conveyor belt upper span 23. In operation, each intermittently formed transversely extending crimp line portion T is moved in register with and is severed by a cutter bar 145 of cutter bar assembly 131; the synchronizing or timing of the respective parts is such that each transversely extending crimp line portion T of the pie stock is severed medianly by a cutter bar 145. A chain drive, including sprockets 151, 153 respectively mounted on crimping bar shaft 85 and cutter bar shaft 133, and a chain 155 preferably interconnect the crimping bar means 53 and cutter bar means 57. Friction drive wheel 103, in addition to driving crimping bar means 53, also drives cutter bar means 57.

It will be understood that the diameters respectively of the working surfaces of crimping bar assembly 83 and cutter bar assembly 131, the spacing or distance between the crimping bar and cutter bar assemblies, and the interconnecting chain drive ratios respectively of crimping bar shaft 85 and cutter bar shaft 131 are relative factors, and each factor is considered and accounted for in timing the machine 11 so that a transversely extending crimp line portion T formed by a crimping bar 97 will subsequently be medianly severed by a cutter bar 145.

It may be desirable in certain applications of the present invention to employ a different number of crimping bars than the pair of bars 97 illustratively shown. Thus, it may be desirable to employ one or three crimping bars. By the same token, it may be desirable to employ a different number of cutter bars than the two cutter bars 145 shown, without departing from the spirit and scope of the present invention. Further, it may be desirable, in certain applications and in machines designed for making the fold-over kind of fried pies, to employ only one crimping wheel 59 and one cutter wheel 115 rather than the pair of crimping wheels and pair of cutter wheels illustrated and described. In making fold-over pies, one sheet of dough is used and is folded over the fruit center, leaving a smooth edge extending longitudinally along one side of the reach of pie stock. Since it is only necessary to crimp the free edge portions of the folded pie stock, it is only necessary to employ one crimping wheel 59 and one cutter wheel 115.

In operation, as a continuous reach of pie stock S is formed and moved along conveyor belt 17, the stock is acted on successionally by the crimping wheel means 51, crimping bar means 53, cutter wheel means 55, and cutter bar means 57. The crimping wheel means and cutter wheel means act continuously and respectively roll and cut the reach of pie stock longitudinally; the crimping bar means and cutter bar means act intermittently and respectively press and cut the reach of pie stock transversely.

The pie forming mechanism of the present invention is mechanically simple and without complicated or intricate parts; it requires minimum maintenance and adjustment; it is substantially self-operable and does not require a number of workmen as heretofore employed in hand-forming pies; it is sanitary; it substantially reduces waste in pie dough and pie filler material; and it forms pies of uniform size and quality. Also, it will be understood that an existing machine, in which the crimping and forming is done manually by operators standing along a moving conveyor, can be quickly and easily converted by the present invention to a machine in which the crimping and forming is mechanically done. Thus, it is only necessary to attach the bearing assemblies 63, 87, 119 and 135 by bolts 77 or the like to the base of the existing machine, whereby the friction wheels 81, 103 and 127 engage the existing conveyor belt to drive the crimping and forming mechanism of the present invention. This is a particularly advantageous concept since there is no necessity to tie into the existing gears, drive, etc. of the existing machine, and there is a minimum of "downtime" in converting the machine.

Although the invention has been described and illustrated with respect to a preferred embodiment thereof, it is to be understood that it is not to be so limited since changes and modifications may be made therein which are within the full intended scope of this invention as hereinafter claimed.

I claim:
1. Attachment means for converting an existing pie making machine in which the crimping and forming is done manually by operators standing along a moving conveyor of said machine and which conveyor carries a continuous reach of pie stock including a lower sheet of dough, an upper sheet of dough, and pie filling between said upper and lower dough sheets, to a machine in which the crimping and forming is done mechanically; said attachment means comprising crimping wheel means, means attachable to said existing pie making machine for rotatably mounting said crimping wheel means in position to rotatably engage substantially continuously said upper dough sheet of said reach of pie stock for pressing and crimping said upper and lower dough sheets together substantially continuously in a crimped line portion extending longitudinally of said reach of pie stock, means connected to said crimping wheel means including friction drive wheel means for frictionally contacting said conveyor to rotatably drive said crimping wheel means, crimping bar means, means attachable to said existing pie making machine for rotatably mounting said crimping bar means in position to rotatably engage intermittently with said upper dough sheet of said reach of pie stock for pressing and crimping said upper and lower dough sheets together intermittently substantially in crimped line portions extending transversely of said reach of pie stock, cutter wheel means, means attachable to said existing pie making machine for rotatably mounting said cutter wheel means in position to rotatably engage substantially continuously with said longitudinally extending crimped line portion of said reach of pie stock for severing the pie stock along said longitudinally extending crimped line portion, cutter bar means, means attachable to said existing pie making machine for rotatably mounting said cutter bar means in position to rotatably engage intermittently with said transversely extending crimped line portions of said reach of pie stock for severing the pie stock intermittently along said transversely extending crimped line portions and for forming a plurality of individual pies having crimped edges, means connected to said crimping bar means and said cutter bar means and including friction drive wheel means for frictionally contacting said conveyor to concurrently and synchronously drive said crimping bar means and said cutter bar means.

2. In a pie making machine of the type including a conveyor having an upper surface movable horizontally and on which is provided a substantially continuous reach of pie stock including a lower sheet of dough, an upper sheet of dough, and pie filling between said upper and lower dough sheets; means for forming said reach of pie stock into a plurality of individual pie pieces comprising crimping wheel means rotatably engageable substantially continuously with said upper dough sheet of said reach of pie stock for pressing and crimping said upper and lower dough sheets together substantially continuously in a crimped line portion extending longitudinally of said reach of pie stock, crimping bar means rotatably engageable intermittently with said upper dough sheet of said reach of pie stock for pressing and crimping said upper and lower dough sheets together intermittently substantially in crimped line portions extending transversely of said reach of pie stock, cutter wheel means rotatably engageable substantially continuously with said longitudinally extending crimped line portion of said reach of pie stock for severing said pie stock along said longitudinally extending crimped line portion, cutter bar means rotatably engageable intermittently with said transversely extending crimped line portions of said reach of pie stock for severing said pie stock intermittently along said transversely extending crimped line portions and for forming a plurality of individual pies having crimped edges, means connected to said crimping bar means and said cutter bar means and including friction drive wheel means for frictionally contacting said conveyor to concurrently and synchronously drive said crimping bar means and said cutter bar means.

3. The machine of claim 2 in which said crimping wheel means includes a shaft, means rotatably mounting said shaft over and transversely of said conveyor, and a crimping wheel having a circumferential undulated rim surface mounted on said shaft, and in which is included a friction drive wheel mounted on said shaft and rotatably engageable with said upper surface of said conveyor, said crimping wheel being driveable by said friction wheel engaging said upper surface of said conveyor and operable to roll over and crimp said upper and lower dough sheets together between said undulated rim surface of said crimping wheel and said upper surface of said conveyor.

4. The machine of claim 2 in which said crimping bar means includes a shaft, means rotatably mounting said shaft over and transversely of said conveyor, and a crimping bar fixed on said shaft having an undulated surface extending substantially parallel to said shaft, and in which said friction drive wheel means includes a friction drive wheel mounted on said shaft and rotatably engageable with said upper surface of said conveyor, said crimping bar being driveable by said friction wheel engaging said conveyor and operable to rotatably engage intermittently the moving reach of pie stock and to crimp and press the upper and lower dough sheets together between said undulated surface of said bar and said upper surface of said conveyor.

5. The machine of claim 2 in which said cutter wheel means includes a shaft, means rotatably mounting said shaft over and transversely of said conveyor, and a cutter wheel mounted on said shaft having a sharp circumferential edge, and in which said friction drive wheel means includes a friction drive wheel mounted on said shaft and engageable with said upper surface of said conveyor, said cutter wheel being adapted to be driven by said friction wheel engaging said conveyor and operable to roll along said longitudinally extending crimped line portion of said reach of pie stock and to rotatably severe the pie stock longitudinally and medianly along said crimped line portion.

6. In a pie making machine of the type including a conveyor belt having an upper surface movable horizontally and on which is provided a continuous reach of pie stock including a lower sheet of dough, an upper sheet of dough, and pie filling between said upper and lower dough sheets; means for forming and crimping said reach of pie stock into a plurality of individual pies comprising a first shaft mounted over and extending transversely of said conveyor belt, a crimping wheel mounted on said first shaft and having a circumferential undulated rim surface, a second shaft rotatably mounted over and extending transversely of said conveyor belt, a crimping bar fixed to said second shaft and having an undulated surface extending substantially parallel to said second shaft, a third shaft rotatably mounted over and extending transversely of said conveyor belt, a cutter wheel mounted on said third shaft and having a sharp circumferential edge, a fourth shaft rotatably mounted over and extending transversely of said conveyor belt, a cutter bar fixed on said fourth shaft and having a sharp edge extending substantially parallel to said fourth shaft; and drive means including friction drive wheel means contacting said conveyor belt surface for rotatably driving said crimping wheel, said crimping bar, said cutter wheel, and said cutter bar synchronously with the travel of said conveyor belt surface; said continuous reach of pie stock moving on said conveyor belt being adapted to be successionally acted on by said crimping wheel, said crimping bar, said cutter wheel, and said cutter bar; said crimping wheel and said cutter wheel acting continuously and respectively rolling and cutting said reach of pie stock longitudinally, said crimping bar and said cutting bar acting intermittently and respectively pressing and cutting said reach of pie stock transversely.

7. The machine of claim 6 in which said friction drive wheel means includes a friction drive wheel mounted respectively on said first, second, and third shafts, with each wheel having a rim surface engaging said upper surface of said conveyor belt, and in which said fourth shaft is interconnected with and driven by said second shaft.

8. In a pie making machine including a conveyor belt having an upper surface movable horizontally and including means for depositing on said conveyor belt upper surface substantially a continuous reach of pie stock including a lower sheet of dough, an upper sheet of dough, and pie filling between said upper and lower dough sheets; means for forming and crimping said reach of pie stock into a plurality of individual pies comprising a first shaft mounted over and extending transversely of said conveyor belt, a crimping wheel mounted on said shaft and having a circumferential crenelated rim surface, a friction drive wheel mounted on said first shaft and rotatably engaging said upper surface of said conveyor belt, a second shaft rotatably mounted over and extending transversely of said conveyor belt, a crimping bar fixed to said second shaft and having a crenelated surface extending parallel to said second shaft, a friction drive wheel mounted on said second shaft and engaging said upper surface of said conveyor belt, a third shaft rotatably mounted over and extending transversely of said conveyor belt, a cutter wheel fixed on said third shaft and having a sharp circumferential edge, a friction drive wheel mounted on said third shaft and engageable with said upper surface of said conveyor belt, a fourth shaft rotatably mounted over and extending transversely of said conveyor belt, a cutter bar fixed on said fourth shaft and having a sharp edge extending substantially parallel to said fourth shaft, means for interconnecting said second and said fourth shafts for synchronous movement of said crenelated surface of said crimping bar and said sharp edge of said cutter bar whereby the travel of said crimping bar crenelated surface and said cutter bar sharp edge is synchronized with the travel of said conveyor belt upper surface for successionally intermittently transversely crimping and cutting said pie stock.

9. The machine of claim 8 in which said crimping bar includes a leading edge disposed at an angle relative to a chord line of the circular path defined by said undulated surface of said crimping bar, and said crimping bar includes a grooved trailing edge portion.

References Cited
UNITED STATES PATENTS

| | | | |
|---|---|---|---|
| 2,434,339 | 1/1948 | Stiles | 107—69 X |
| 2,437,202 | 3/1948 | Marino | 107—1 |
| 3,277,845 | 10/1966 | Poppe et al. | 107—1 |

WALTER A. SCHEEL, *Primary Examiner.*

J. SHEA, *Assistant Examiner.*